US008644814B2

(12) United States Patent
Quadri et al.

(10) Patent No.: US 8,644,814 B2
(45) Date of Patent: Feb. 4, 2014

(54) AUTOMATED FAULT REPORTING IN FEMTO CELLS

(75) Inventors: Sadia Quadri, Bristol (GB); Parag Gopal Kulkarni, Bristol (GB); Zhong Fan, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 179 days.

(21) Appl. No.: 13/039,942

(22) Filed: Mar. 3, 2011

(65) Prior Publication Data

US 2011/0244852 A1    Oct. 6, 2011

(30) Foreign Application Priority Data

Mar. 25, 2010  (GB) .................................. 1005074.8

(51) Int. Cl.
*H04W 24/00* (2009.01)
(52) U.S. Cl.
USPC ............... 455/423; 455/420; 455/445; 455/9; 455/11.1; 455/13.1
(58) Field of Classification Search
USPC ........ 455/428, 429, 432.1–453, 456.1–456.4, 455/466, 41.2; 370/328–334
See application file for complete search history.

(56) References Cited

U.S. PATENT DOCUMENTS

| 8,254,943 | B1 * | 8/2012 | Dinan et al. ................... 455/450 |
| 2005/0181794 | A1 * | 8/2005 | Rajkotia ....................... 455/436 |
| 2008/0132239 | A1 | 6/2008 | Khetawat et al. |
| 2009/0131049 | A1 * | 5/2009 | Osborn ....................... 455/435.1 |
| 2010/0027431 | A1 | 2/2010 | Morrison et al. |
| 2011/0053599 | A1 * | 3/2011 | Hsu et al. ...................... 455/436 |
| 2011/0151764 | A1 * | 6/2011 | Kastell et al. ................... 454/76 |
| 2011/0189985 | A1 * | 8/2011 | Gao et al. ................... 455/422.1 |
| 2011/0287772 | A1 * | 11/2011 | Park et al. ..................... 455/450 |
| 2012/0275427 | A1 * | 11/2012 | Kalhan ......................... 370/330 |
| 2012/0329492 | A1 * | 12/2012 | Ergen et al. ................... 455/466 |

FOREIGN PATENT DOCUMENTS

| EP | 0 656 711 A2 | 6/1995 |
| EP | 2 051 547 A1 | 4/2009 |
| JP | 2010-41258 | 2/2010 |
| WO | WO 2009/070072 A1 | 6/2009 |
| WO | WO 2010/072148 A1 | 7/2010 |

OTHER PUBLICATIONS

Greg Bathrick, et al., "CPE WAN Management Protocol", Technical Report, DSL Forum TR-069, May 2004, 109 pages.
United Kingdom Search Report Issued Jul. 7, 2010, in Great Britain Patent Application No. 1005074.8, filed Mar. 25, 2010.

\* cited by examiner

*Primary Examiner* — Dai A Phuong
(74) *Attorney, Agent, or Firm* — Oblon, Spivak, McClelland, Maier & Neustadt, L.L.P.

(57) ABSTRACT

An arrangement for wireless communication includes apparatus operable to establish a region of wireless communications capability, and operable to establish communication with a communications hub by way of a backhaul. The apparatus is operable to determine availability of communication facilities on the backhaul and, in response to a request by a communications device operating with the use of the region of wireless communications capability, is operable to offer the backhaul implemented communication facilities to the communications device subject to the existence of a fault in offering of said facilities. The apparatus includes fault detection means operable to detect the presence of a fault. In the event of a fault being detected, the apparatus is operable to emit a signal intended to communicate the existence of the fault to t communications device.

15 Claims, 3 Drawing Sheets

AUTOMATED FAULT REPORTING IN FEMTO CELLS

FIELD

Embodiments described herein relate generally to the reporting of faults arising in femto cells, and associated responses to such reports.

BACKGROUND

Femto cells (also popularly known as Home Base Stations) are small scale cellular home access points which can act as either a standalone device or can be integrated into a home gateway for use within indoor environments. Although the adoption of femto cells remains at an early stage, they are already recognised to be advantageous in improving coverage and capacity. The term "femto cell" is often used to describe both the device itself, and the wireless communication zone created thereby. In the following, the meaning of the term at the particular instance will be evident from the context.

DETAILED DESCRIPTION

Figure 1:
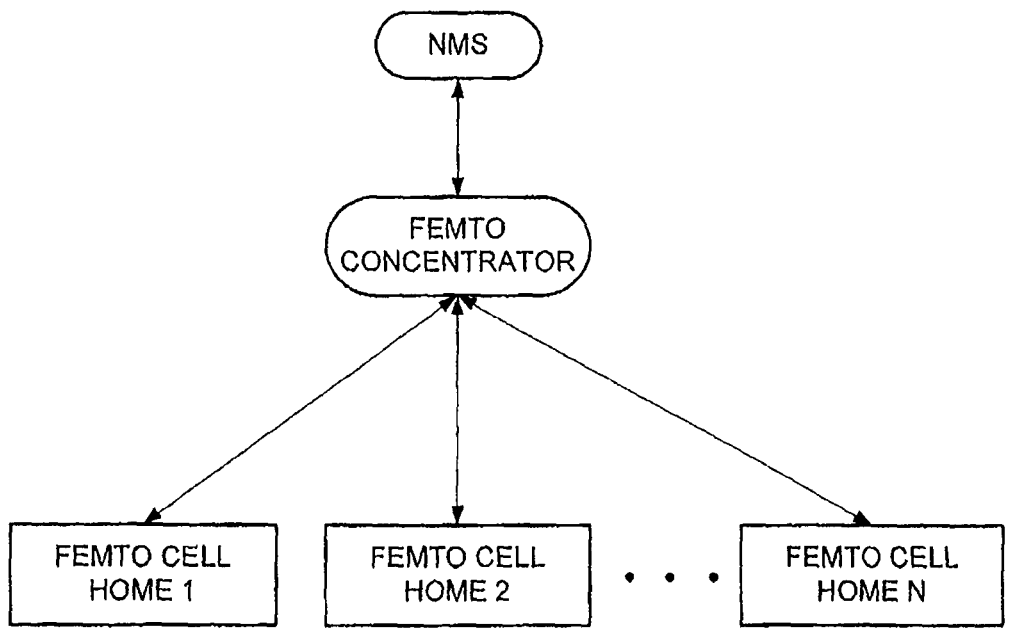
FIG. 1 is a system architecture diagram for an arrangement in accordance with an embodiment of the invention.

As femto cells have not yet been widely deployed in the market, some of the impact of such devices can only be speculated upon. However, it is likely that network operators (that is, operators of macrocell wireless telecommunications networks) will encourage their deployment to reduce the need for macrocell coverage throughout otherwise obscured or radio-opaque environments. By encouraging users to deploy femto cells, an operator can overcome the existence of macrocell dead zones (regions which are not covered by a macrocell, or not to an acceptable extent) within a home or small commercial environment. This reduces the need for a macrocell network operator to provide additional infrastructure, or additional transmission power, to facilitate enhanced user experience.

The primary reason for deployment of femto cells within a home is to solve the problem of dead zones (transmission areas which are not covered by macro cells) and to enable operators to offer extra data services (in order to increase their revenue) (such as instant messaging, video, internet etc) to cellular devices referred to hereinafter as User Equipment (UE). It might be difficult, due to the practical constraints imposed by the quality of existing macro cell communication techniques to offer data services to users without such additional enhancement. The installation of a femto cell offers the opportunity for UEs to connect to the femto cell within the home and to communicate with an operator's core network management system NMS using a wired backhaul. This solution is especially attractive for a situation in which the signal from a macrocell cannot penetrate into the interior of a building due to difficult radio propagation conditions. Thus, in such a situation, the UE uses the femto cell as a base station instead of using the distant, and possibly obscured macrocell base station, thereby achieving a superior connection. This not only off-loads traffic from the macrocell but also creates additional network capacity.

Reduced load on the existing macrocell network, by off-loading traffic to femto cells, can also contribute to an improvement to macrocell performance. At the same time the network operator's commitment to capital and operating expenditure can be reduced. Moreover, such capacity improvements may enable an operator to develop competitive pricing plans such as unlimited usage at flat rates, comparable with pricing plans offered by fixed line network operators today. The cellular network operator might be able to provide an incentive for use of a femto cell, such as reduced/zero call charges, as this will result in better performance (improvement in capacity) at a lower cost to the customer or consumer, through lower usage rates and potentially lower tariffs.

Femto cells are designed to be customer premise equipment. Because there may be thousands of such devices in a given locality and, particularly, in a given macro cell, and since the nature of deployment is ad hoc, it may not be possible to carry out network planning, in contrast to the elaborate and intricate network planning often associated with cellular networks. Femto cells are likely to be installed by end users (most of whom will not have specific technical knowledge) as the provision of a skilled technician to do this will likely be prohibitively expensive. Thus, femto cells are expected to be "plug and play", whereby they will self configure and self optimize during setup and operation. Once power is supplied to a femto cell, there are several tasks that it needs to perform. Firstly, it must discover the operator's networks and register itself. The registration process involves the femto cell sending its credentials to the network's authentication server which then authenticates the femto cell. Subsequent to successful authentication, the operator's network sends initial values for configuration parameters.

While this addresses the initial operational configuration, the reporting procedures to be adopted on failure are yet to be considered in the existing published art.

It is expected that femto cells will be deployed in customer's homes and other uncontrolled environments. Customers can be anticipated to carry out some activities that are not controlled by the operator but might affect femto cell performance, such as turning the device on and off, resetting the device, disconnecting the DSL line, and so on. There are mechanisms and proposals in the above mentioned standard to deal with such activities. However when a UE is in operation and the femto cell device fails, an interruption in service will arise until the fault is fixed.

When faults occur in a femto cell, such that UEs in the respective home are unable to connect to the operator's core network then any dead zone associated with the macro cell network may impact on operation of the UE. That is, if the femto cell were deployed to solve a problem with macro cell coverage, then this problem will re-emerge. Additionally, any enhanced services reliant on provision of the femto cell will become unavailable.

Some possible methods to retain connectivity with the operator's core network include handover to a neighbouring femto cell if prior agreement exists between femto cells, or handover to the macro cell. Handover to the macro cell could be problematic as the macro cell coverage may be poor in the location of the UE but it may be possible, despite poor QoS, to support at least a limited level of communication.

Fault management involves three aspects, namely fault identification, fault reporting and fault recovery.

When a UE is unable to communicate with a femto cell, a fault is readily apparent. This fault then needs to be communicated to the operator's core network or to the UE so that the fault can be diagnosed and an appropriate recovery process initiated.

It is desirable to keep the procedural aspects of fault management hidden from the end user. This reduces the possibility of a user interfering in what should be an automatic process, and also reduces user concern. It may be possible, if fault recovery is effected quickly, to avoid a user becoming aware even of the existence of a fault.

Most published disclosures in the field of relevance discuss self management and automated fault recovery mechanisms for femto cells. However, it is apparent that there is no discussion of procedures for reporting faults when the software/firmware is itself faulty, or the backhaul to the operator's core network is broken. There is no apparent disclosure of a fault reporting mechanism for femto cells or mechanisms for communicating fault, to an operator's core network.

Embodiments described herein provide a fault reporting procedure for femto cells wherein a faulty femto cell is reported to an operator's core network by a UE previously associated with the femto cell (i.e. the UE belongs to the femto cell's subscriber group) via a neighbouring femto cell.

Embodiments described herein provide a fault reporting procedure for femto cells wherein a faulty femto cell is reported to an operator's core network by a UE previously associated with that femto cell (i.e. the UE belongs to the femto cell's subscriber group) via a macro cell with which the UE has a communication facility.

Embodiments described herein provide a notification method intended to inform a user of a faulty connection using a local SMS.

An embodiment described herein comprises a method of managing a fault in a communication network, the communication network comprising a first station operable to establish a long range wireless communication zone and a second station operable to establish a short range wireless communication zone, comprising
 determining the nature of the fault;
 searching for an alternative communication pathway avoiding the fault; and
  on finding an alternative communications pathway, communicating with a communicating wireless equipment information describing said pathway; else communicating to said wireless equipment the absence of such a pathway.

An embodiment described herein provides a wireless communications apparatus operable to establish a region of wireless communications capability, and operable to establish communication with a communications hub by way of a backhaul, the apparatus being operable to determine availability of communication facilities on said backhaul and, in response to a request by a communications device operating with the use of said region of wireless communications capability, being operable to offer said backhaul implemented communication facilities to said communications device subject to the existence of a fault in offering of said facilities, said apparatus including fault detection means operable to detect the presence of a fault and such that, in the event of a fault being detected, said apparatus is operable to emit a signal intended to communicate said existence of said fault to said communications device.

An embodiment described herein provides a wireless communications apparatus comprising first communications means operable to establish a communications link with a first station operable to establish a long range wireless communication zone and second communications means operable to establish a communications link with a second station operable to establish a short range wireless communication zone, the apparatus being operable to identify available communications facilities and to select one therefrom, the apparatus including fault management means operable to identify a fault and, in the event of such identification, to collect information to enable the management of said fault and to determine a way of avoiding impact of said fault.

While embodiments such as those described herein can be implemented in any conceivable way, one approach would be to implement the same by way of a computer implementation. This could be by way of a computer specifically designed for the purpose, or one adapted to the purpose by additional hardware or software or a combination of the two.

Introduction of software may include a fully configured software product, comprising computer executable code operable to cause implementation of such an embodiment, or a partial product operable to call up use of existing software components, such as a library of components pre-supplied on a general purpose computing device. This partial product could be in the form of a plug in. The software product, in whatever configuration, could be supplied on a computer readable medium, such as an optical disk, or a mass storage device, or could be supplied on a suitable computer readable signal.

In the following description, various assumptions are made for ease of description. These assumptions are based on the expected mode of implementation of a femto cell network.

In a femto cell network, in accordance with this specific embodiment, femto cells are deployed for enhancement of communication alongside a macro cell based network. A macro cell is defined by a macrocell base station, being the limit of practical communication between that base station and compatible communications devices, such as portable telephone devices. Such communications devices are referred to as user equipment (UE) throughout this description.

Femto cells are physically placed, on the basis of user choice, at locations perceived by that user to have weak macrocell signal. It will be appreciated by the reader that this user perception may be based on real signal data, or may be based on more speculative processes, or merely random placement.

A femto cell, in this embodiment, is envisaged to be supplied by or for a particular macrocell network operator, and is a device capable of establishing a small range (orders of magnitude smaller than a macrocell) of communication thereabout, with compatible UEs. It will be understood that, despite this provision of a femto cell by a macrocell operator, the process of placement will generally not include any intervention from the macrocell operator, and so the physical positioning of femto cells will be out of the macrocell operator's control.

It is envisaged that, whereas the coverage area of a macrocell could be of a few hundred metres, to several kilometres (depending on the equipment used and the local environment), the dimension of the coverage area of communication of a femto cell is likely to be a few metres.

It should be appreciated by the reader that, in order to avoid confusion with other disclosures on such matters, the use of the term "femto cell" herein refers to the device defining the coverage area, and not to the coverage area itself. Thus, the term "femto cell" employed here might be considered roughly synonymous to the term "Access Point Base Station" as might have been encountered in previous disclosures.

In this embodiment, it is expected that several femto cells will be deployed in a given general area. As such, neighbouring femto cells may be within communication range of each other. In the event that this arises, such femto cells are configured in accordance with this embodiment to cooperate with each other, to forward signalling information to a macrocell operator's core network.

For the purposes of this disclosure, such femto cells are assumed to be associated with the same macrocell operator. The reader will appreciate that different macrocell operators exist in parallel in many jurisdictions, and as such different femto cell subscriber groups will exist.

In this embodiment, each UE is operable to be capable of sending special signalling messages via a neighbouring femto cell irrespective of the subscriber group with which the UE is associated.

Each femto cell deployed in this embodiment is connected to the macrocell operator's core network by way of a physical network. This physical network is referred to as "backhaul" and comprises a DSL connection to the Internet, providing a communication pathway to the macrocell operator's core network.

By this, the macrocell operator's core network is capable of configuring a femto cell via a neighbouring femto cell or the backhaul.

A UE in accordance with this embodiment of the invention comprises location identifying means, by which it is capable of identifying its location. By this, the UE can interact with a local femto cell to determine if it is in the coverage area of its associated femto cell or not, in order to avoid false alarms.

In one configuration of the described embodiment, the macrocell operator's core network comprises a fault management module which deals with reported faults. In another configuration, this module is present in a femto cell concentrator.

FIG. 1 shows an architectural view of the femto cell network of the embodiment. The network 10 comprises a plurality of femto cells 20 each connected to a femto cell concentrator 30 via a DSL connection. The femto cell concentrator 30 acts as an intermediate entity interfacing the femto cells 20 to a network operator's core network (via the illustrated Network Management System 40) and vice versa.

Figure 2:
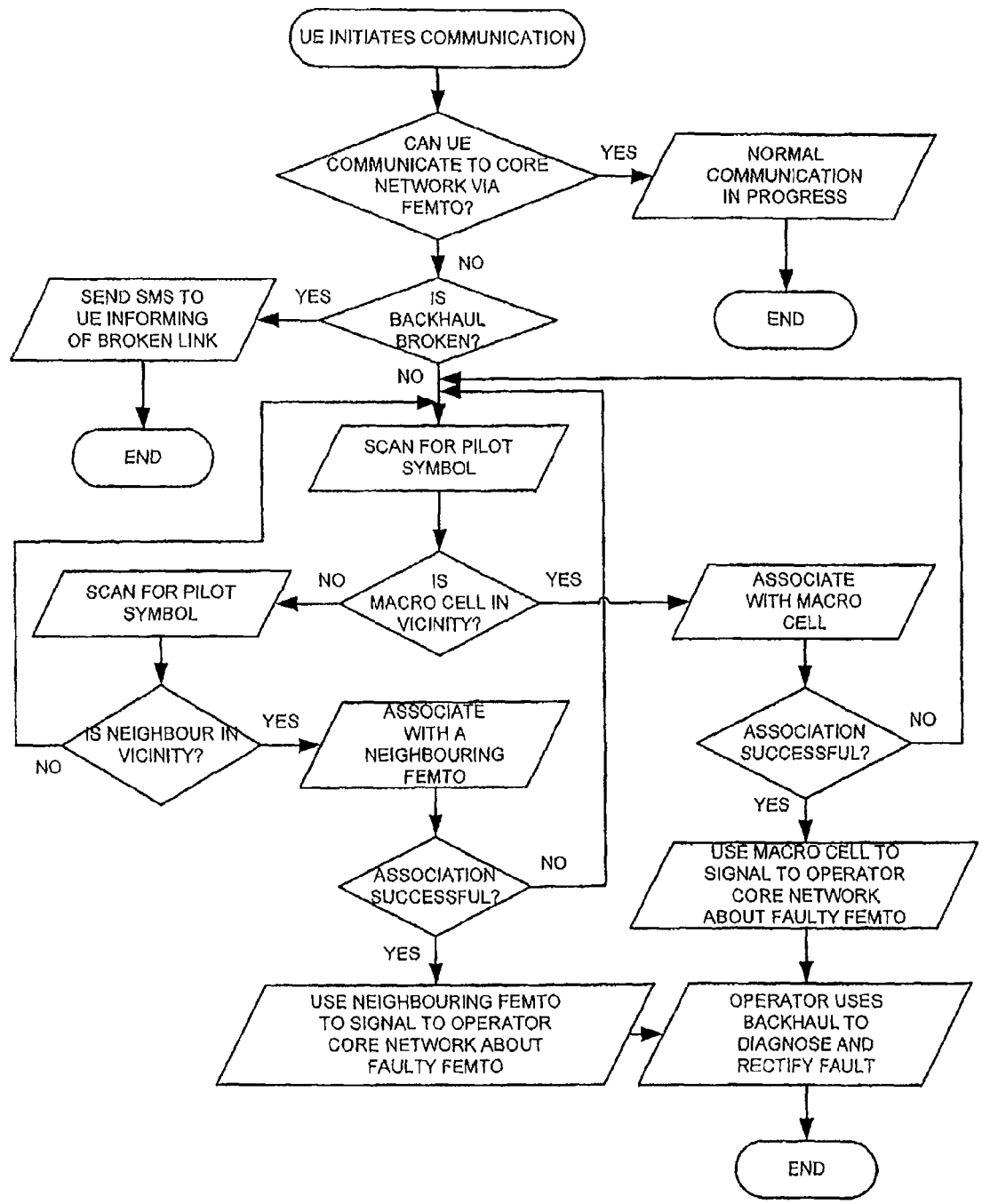
FIG. 2 is a flow diagram illustrating a fault detection and management procedure in accordance with the specific embodiment.

The flow chart in FIG. 2 explains this fault reporting mechanism. The mechanism aims to address three possible scenarios, namely:
1. If the backhaul is broken
2. If the femto cell is faulty and the macro cell is not in the vicinity of the UE
3. If the femto cell is faulty and the macro cell is in the vicinity of the EU Scenario 1: A Fault in the Backhaul If the backhaul is faulty then, when the UE communicates via the femto cell, the femto cell will respond with a local SMS to the UE informing the UE that the femto cells backhaul connection is faulty.

Scenario 2: A Faulty Femto Cell with No Macro Cell in Vicinity

If a femto cell is faulty then, when the UE tries to communicate via the femto cell and is unable to get the signal, the UE first scans for a pilot signal from its neighbouring femto cell and then associates with the neighbouring femto cell. The UE then uses this neighbouring femto cell to signal to the operator's core network of the status of the faulty device. An example of the signal could be an SMS text message. In response, the operator runs tests on the device and rectifies the fault.

Scenario 3: A Faulty Femto Cell with a Macro Cell in Vicinity

In this case, when the UE tries to communicate via the femto cell and is unable to obtain a signal, the UE scans for a pilot signal from an available macro cell. On receipt of this signal, the UE associates itself with the macro cell and uses it to signal to the operator's core network of the existence of the faulty device. For example, the signal could be an SMS text message. In response, the operator runs some tests on the device and rectifies the fault.

It should be noted that these fault diagnosis and recovery operations can be handled either by the operator's core network or within the femto cell concentrator itself.

Conventional systems do not specify a fault reporting procedure for femto cells. They only mention automatic recovery mechanisms when femto cells are disconnected or powered off and on. The disclosed embodiment claims to solve this problem of reporting the fault in the normally operating femto cell so that it can be identified and responsible entities can be notified quickly with little or no user interaction.

The first part of the disclosed process consists of fault classification, that is whether the device is faulty or the connection is faulty. If the connection is faulty then there is no need to inform the operator since this connection might be provided by a third party. Informing the user about the connection problem would mean that the user might attempt to personally rectify this problem.

Secondly, if the femto cell itself is faulty then the message can be communicated to the operator which then uses his diagnosis procedure and rectifies the fault.

Users can experience frustration if devices fail to operate as expected. This can resort in user action such as complaints, or extended telephone communication with network operations. Customer service calls can create long delays and can increase operational expenses for an operator. The presently described embodiment proposes an automated approach to dealing with faults in femto cells and their backhaul connectivity.

Figure 3:
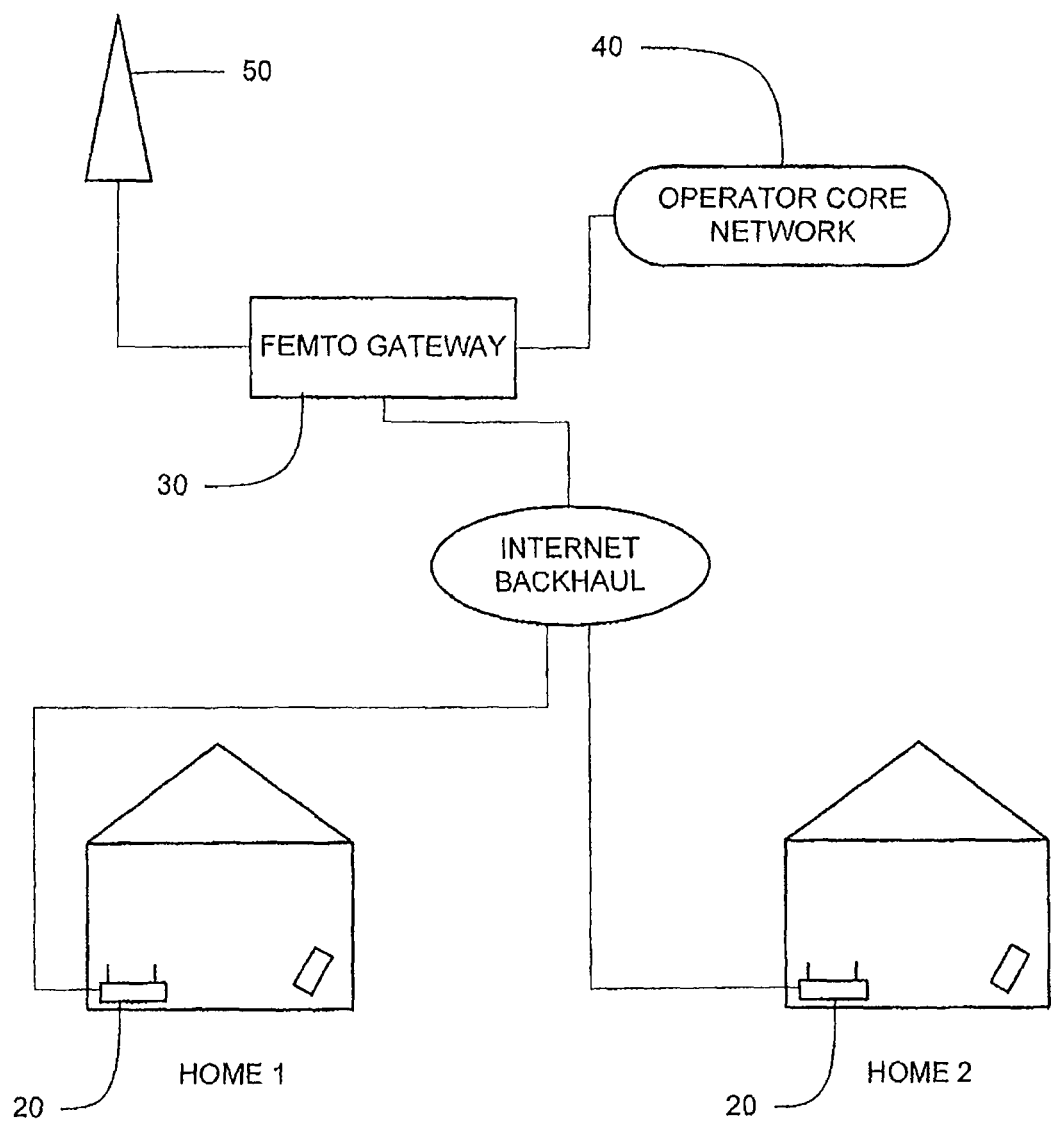
FIG. 3 is a schematic diagram of deployment of the specific embodiment of the invention.

FIG. 3 shows an example implementation of femto cells 20 within homes (1 and 2). Femto cells 20 are connected to the gateway 30 via IP which is the backhaul DSL/fibre link to the gateway. In case 1, assuming that the backhaul in home 1 is faulty then, when the UE tries to communicate, the femto cell 20 returns an SMS to it informing it about the faulty backhaul connection.

In case 2, where the femto cell 20 itself is faulty, the UE is unable to communicate with the femto cell. Then, the UE looks for a macro cell 60. If a macro cell 60 is available, then the UE uses it to signal to the operator's core network of the faulty femto cell 20. If not, then it uses the femto cell in home 2 to signal to the operator about its faulty femto cell (assuming that the neighbouring femto cell 20 belongs to the same operator and allows the UE to latch onto it).

The invention has been exemplified by the above embodiments, but without any implication that the invention is limited thereto. The scope of the invention for which protection is sought should be determined from the following claims, which are to be read in the light of, but not limited specifically to, the foregoing description, in conjunction with the appended drawings.

Whilst certain embodiments have been described, these embodiments have been presented by way of example only, and are not intended to limit the scope of the inventions. Indeed, the novel devices, methods and products described herein may be embodied in a variety of other forms; furthermore, various omissions, substitutions and changes in the form of the methods, apparatus and products described herein may be made without departing from the spirit of the inventions. The accompanying claims and their equivalents are intended to cover such forms or modifications as would fall within the scope and spirit of the inventions.

The invention claimed is:

1. A method of managing a fault in a communication network, the communication network comprising a network core, a first station operable to establish a long range wireless communication zone and a second station operable to establish a short range wireless communication zone, the first station and the second station being configured to facilitate connection of wireless user equipment to the network core, the method comprising:
   determining the nature of the fault, the fault precluding the second station from communicating with the network core;
   searching for an alternative communication pathway for connecting said wireless user equipment to the network core and avoiding the fault;
   communicating information describing said alternative communication pathway to said wireless user equipment, when said alternative communication pathway is found; and
   communicating, to said wireless user equipment, information specifying the absence of said alternative communication pathway, when said alternative communication pathway is not found.

2. The method in accordance with claim 1 wherein said alternative communication pathway includes the first station and excludes the second station when the nature of the fault is determined be based on inoperability of the second station.

3. The method in accordance with claim 1, wherein the communication network further comprises a backhaul that establishes communication between said second station and a communications hub, that is in communication with the first station, and
   when the nature of the fault is determined to be based on said the backhaul, the second station sends a message to said wireless user equipment that specifies that said backhaul is less than fully operational.

4. The method in accordance with claim 1, wherein communicating at least one of said information describing said alternative communication pathway and said information specifying the absence of said alternative communication pathway includes emitting a message for transmission to the wireless user equipment.

5. The method in accordance with claim 4, wherein said message comprises a text message.

6. The method in accordance with claim 4, wherein said message is in a Short Message Service (SMS) format.

7. The method in accordance with claim 4, wherein said message is directly transmitted to said wireless user equipment.

8. The method in accordance with claim 4, wherein said message is indirectly transmitted to said wireless user equipment.

9. The method in accordance with claim 1, wherein the second station is a device associated with a femto cell.

10. The method in accordance with claim 1, wherein the short range wireless communication zone is a femto cell.

11. The method in accordance with claim 1, wherein the long range wireless communication zone is a macro cell.

12. A wireless user device for wirelessly communicating data over a communication network, the communication network comprising a network core, a first station operable to establish a short range wireless communication zone and a second station operable to establish a wireless communication zone, the first and second stations being configuration to facilitate connection of the user device to the network core, the user device comprising:
   a communications interface operable to establish a first communications link with the first station
   and operable to establish a second communications link with the second station;
   a fault identifier operable to identify a fault precluding the first station from communicating with the network core and, when the fault identifier identifies the fault, to communicate information concerning the fault to a fault manager associated with the network via the second station, the fault manager operable to rectify the fault.

13. The user device of claim 12, wherein the second station is operable to establish a long range wireless communication zone.

14. A non-transitory computer-readable storage medium having computer readable program codes embodied in the computer-readable storage medium that, when executed cause a computer to execute the method in accordance with claim 1.

15. A method of managing a fault in a communication network, the communication network comprising a network core, a first station operable to establish a short range wireless communication zone and a second station operable to establish a wireless communication zone, the first and second stations being configured to facilitate connection of wireless user equipment to the network core, the method comprising:
   attempting to establish a connection between the wireless user equipment and the network core via the first station;
   identifying, by the wireless user equipment, a fault precluding the first station from communicating with the network core;
   communicating information concerning the fault from the wireless user equipment, via the second station, to a fault manager associated with the network; and
   using the fault manager to rectify the fault such that the wireless user equipment is enabled to connect to the network core via the first station.

* * * * *